United States Patent
Khare et al.

(10) Patent No.: US 10,114,952 B2
(45) Date of Patent: Oct. 30, 2018

(54) SYSTEM, APPARATUS AND METHOD FOR PERFORMING SECURE MEMORY TRAINING AND MANAGEMENT IN A TRUSTED ENVIRONMENT

(71) Applicant: McAfee, Inc., Santa Clara, CA (US)

(72) Inventors: Atul A. Khare, Portland, OR (US); Karunakara Kotary, Portland, OR (US); Rajesh Poornachandran, Portland, OR (US); Vincent J. Zimmer, Federal Way, WA (US); Sudeep Das, Cupertino, CA (US)

(73) Assignee: MCAFEE, LLC, Santa Clara, CA (US)

( * ) Notice: Subject to any disclaimer, the term of this patent is extended or adjusted under 35 U.S.C. 154(b) by 111 days.

(21) Appl. No.: 15/084,564

(22) Filed: Mar. 30, 2016

(65) Prior Publication Data

US 2017/0286679 A1 Oct. 5, 2017

(51) Int. Cl.
*G06F 11/00* (2006.01)
*G06F 21/56* (2013.01)
*G06F 3/06* (2006.01)

(52) U.S. Cl.
CPC .......... *G06F 21/566* (2013.01); *G06F 3/0622* (2013.01); *G06F 3/0637* (2013.01); *G06F 3/0673* (2013.01)

(58) Field of Classification Search
CPC ...... G06F 21/575; G06F 11/073; G06F 21/53; G06F 21/572; G06F 2221/2149; G06F 11/2247; G06F 21/566; G06F 3/0637; H04L 63/1441
See application file for complete search history.

(56) References Cited

U.S. PATENT DOCUMENTS

| | | | | |
|---|---|---|---|---|
| 8,645,716 B1* | 2/2014 | Dujari | ................ | G06F 12/1433 380/277 |
| 2006/0064563 A1* | 3/2006 | Hobson | ............... | G06F 12/0638 711/170 |
| 2008/0040526 A1* | 2/2008 | Suzuki | ............... | G06F 13/4081 710/302 |
| 2009/0119498 A1* | 5/2009 | Narayanan | ............ | G06F 9/4401 713/2 |
| 2009/0265756 A1* | 10/2009 | Zhang | ..................... | G06F 21/53 726/1 |
| 2011/0154006 A1* | 6/2011 | Natu | ..................... | G06F 21/575 713/2 |
| 2011/0320798 A1* | 12/2011 | Zimmer | ................. | G06F 21/14 713/2 |

(Continued)

OTHER PUBLICATIONS wikipedia.org, "Memory Reference Code," Oct. 2015, 2 pages.

(Continued)

*Primary Examiner* — Farid Homayounmehr
*Assistant Examiner* — Lizbeth Torres-Diaz
(74) *Attorney, Agent, or Firm* — Hanley, Flight & Zimmerman, LLC

(57) ABSTRACT

In one embodiment, a system includes: a processor; a security processor to execute in a trusted executed environment (TEE), the security processor to execute memory reference code (MRC) stored in a secure storage of the TEE to train a memory coupled to the processor; and the memory coupled to the processor. Other embodiments are described and claimed.

14 Claims, 5 Drawing Sheets

(56) References Cited

U.S. PATENT DOCUMENTS

| | | | |
|---|---|---|---|
| 2012/0023318 A1* | 1/2012 | Xing | G06F 9/4403 713/2 |
| 2014/0013095 A1* | 1/2014 | Zimmer | G06F 21/14 713/2 |
| 2014/0192583 A1* | 7/2014 | Rajan | G11C 7/10 365/63 |
| 2015/0095633 A1* | 4/2015 | Yao | G06F 21/575 713/2 |
| 2016/0080320 A1* | 3/2016 | Barakat | H04L 63/00 726/4 |
| 2017/0168849 A1* | 6/2017 | He | G06F 9/4406 |

OTHER PUBLICATIONS

Intel Corporation, "Intel® Xeon® Processor E7 Family: Reliability, Availability, and Serviceability Advanced data integrity and resiliency support for mission-critical deployments," 2011, 16 pages.
Project Zero, "Exploiting the DRAM rowhammer bug to gain kernel privileges," Mar. 9, 2015.
Intel Corporation, "Minimal Intel Architecture Boot Loader; Bare Bones Functionality Required for Booting an Intel Architecture Platform," Jan. 2010, 26 pages.

\* cited by examiner

SYSTEM, APPARATUS AND METHOD FOR PERFORMING SECURE MEMORY TRAINING AND MANAGEMENT IN A TRUSTED ENVIRONMENT

BACKGROUND

In modern computing systems, a special management mode, sometimes referred to as a system management mode (SMM), is used for physical memory manipulation operations such as hot plug, error management, and so forth. Since the SMM code is running from the same physical memory in which these operations are performed, this arrangement is liable to Heisenberg's law, and may have issues where the memory backing SMM code has a flaw.

During hot plug operation, additional memory is dynamically added to a system. Typically to support a memory hot add feature efficiently, system firmware executes memory training code in this SMM so that an operating system (OS) can use the newly added memory module dynamically. However, this training introduces challenges, in that the code to perform this training needs to time-share/perform processor (e.g., central processing unit (CPU)) cycle-stealing to execute, which adversely impacts an active workload being handled by OS. Given typical restrictions imposed by the OS, there may be temporal limitations on a duration of SMM execution, which can undesirably impact performance and lengthen time required for completion of the memory training.

DETAILED DESCRIPTION

In various embodiments, memory training operations may be executed in a sequestered manner from a main or host processor of a system. In this way, memory training may be performed more securely, while reducing impact on host processor operation. Although there can be different possible implementations of this sequestered memory training, embodiments herein relate to a separate security processor and/or trusted execution environment (TEE) separate and apart from a host processor and system software. In a particular embodiment a platform-based TEE applet or other TEE-based technique can be used to securely perform memory reference code (MRC) training independently of a host OS/virtual machine monitor (VMM) for better efficiency and security.

Figure 1:
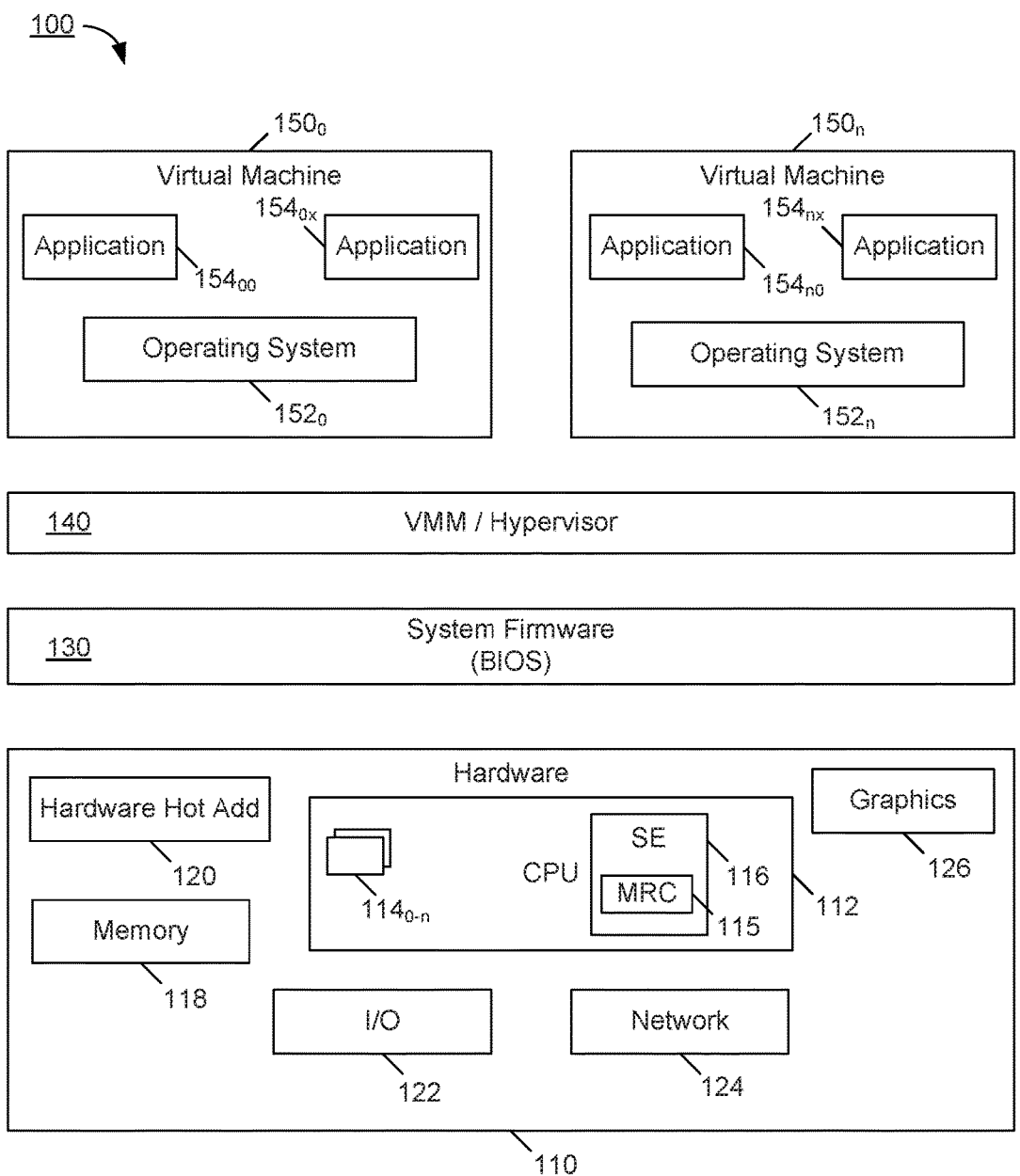
FIG. 1 is a block diagram of a system in accordance with an embodiment of the present invention.

Referring now to FIG. 1, shown is a block diagram of a system in accordance with an embodiment of the present invention. As one example, system 100 may be a server computer, such as a rack-mounted server present in a rack of a data center. In other cases, system 100 may be a standalone computer system, such as a server computer, desktop computer, laptop computer or so forth.

As illustrated, computer system 100 includes hardware 110. Different types of hardware may be present in different embodiments. For purposes of discussion and illustration, assume that computing system 100 is a server computer. Hardware 110 includes one or more central processing units (CPUs) 112. In embodiments, each CPU 112 may include at least one core, and typically a plurality of cores $114_0$-$114_n$. In addition, each CPU 112 may include a separate security hardware engine 116, also referred to as a secure engine, which in an embodiment may be implemented as a secured microcontroller or other separate hardware processing unit. In some embodiments, secure engine 116 may be implemented as a sequestered one of cores 114. As will be described herein, secure engine 116 may include a memory reference code (MRC) module 115. In various embodiments, MRC module 115 may be implemented as hardware, software and/or firmware or combinations thereof to perform memory initialization operations for a memory 118.

In embodiments, memory 118 may be implemented as a dynamic random access memory (DRAM), such as one or more dual inline memory modules (DIMMs). And as will be discussed herein, in server implementations, additional memory 120 may be dynamically incorporated into system 100 via a hot plug operation. Hardware 110 may further include at least one input/output (I/O) interface 122, a network interface 124, and a graphics processor 126. In some embodiments, graphics processor 126 may be one or more standalone graphics processors, while in other cases graphics processor 126 may be implemented as one or more graphics processors within CPU 112 (such as one or more graphics processing units (GPUs)) of a system-on-chip (SoC)).

FIG. 1 further shows interaction with various levels of software, including a system firmware 130, which in an embodiment may be implemented as a unified extensible firmware interface (UEFI) basic input/output system (BIOS) 130. BIOS 130 may be provided by one or more read only memories (ROMs) of system 100, and may be configured to perform low level operations, including various initialization operations, interface operations and so forth. In some cases, BIOS 130 may include memory reference code also, while in other cases, memory reference code may only execute within secure element 116.

In turn, system firmware 130 interfaces with a hypervisor/virtual machine monitor (VMM) 140, which may operate to virtualize the underlying hardware 110 and provide an interface to and control of multiple virtual machines (VMs) $150_0$-$150_n$, which execute on hardware 110. As illustrated, each VM 150 may include a plurality of applications $154_{00}$-$154_{0x}$ (and applications $154_{n0}$-$154_{nx}$), which in turn execute on underlying operating systems $152_0$-$152_n$. Understand while shown at this high level in the embodiment of FIG. 1, many variations and alternatives are possible.

Figure 2:
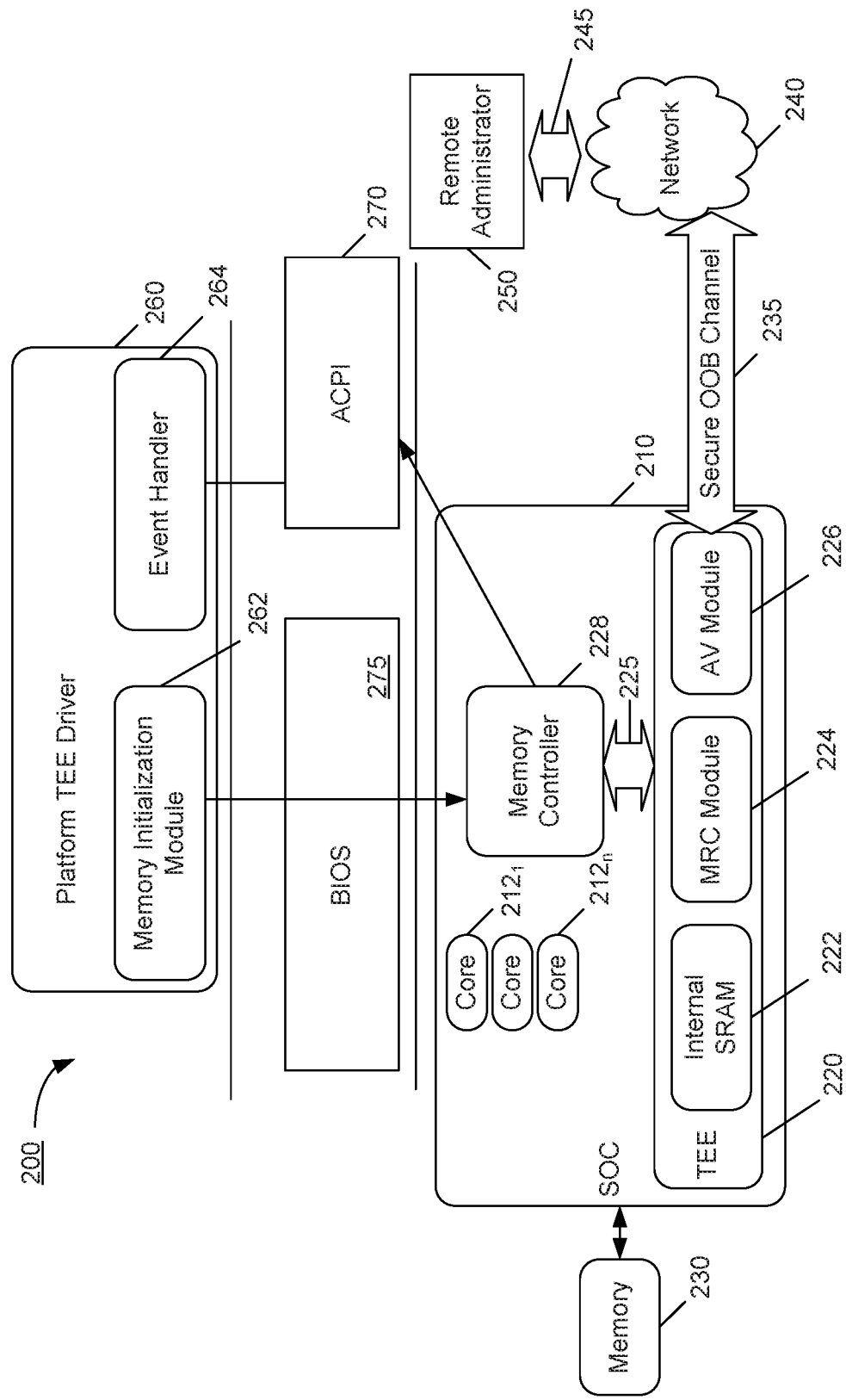
FIG. 2 is a block diagram of a system in accordance with another embodiment of the present invention.

Referring now to FIG. 2, shown is a block diagram of a system in accordance with another embodiment of the present invention. More specifically, system 200 provides further details regarding an arrangement of a TEE-based MRC in accordance with an embodiment. As illustrated, system 200 includes a SoC 210. In turn, SoC 210 includes a plurality of cores $212_1$-$212_n$, and a TEE 220. In an embodiment, TEE 220 may be implemented as a separate hardware processor, such as all or a portion of a manageability engine, such as a converged security manageability engine (CSME), converged security engine (CSE), Intel® Software Guard Extensions (SGX) or other separate security processor, such as a security coprocessor, security microcontroller or so forth.

As illustrated, TEE 220 includes various internal hardware. For purposes of discussion here, TEE 220 is shown to include a MRC module 224, an antivirus (AV) module 226, and an internal memory 222, which in an embodiment may be implemented as static random access memory (SRAM). TEE 220 may further include a persistent storage, in some embodiments. AV module 226 may perform, in addition to antivirus operations, malware detection and remediation operations. As such, as used herein, the terms "AV" or "AV module" are to be construed broadly to include antivirus as well as malware detection and remediation operations, logic, hardware circuitry and the like. Understand that additional hardware circuitry and logic may be present in various embodiments. TEE 220 communicates with an internal memory controller 228 via a secure out-of-band (OOB) channel 225. As will be described herein, memory controller 228 may indicate to TEE 220 that additional system memory 230 has been added dynamically (e.g., via a hot plug operation) via OOB channel 225.

TEE 220 provides a tamper resistant secure isolated environment with dedicated storage, namely memory 222. Note that MRC module 224 may be implemented in some embodiments as hardware, software, firmware, and/or combinations thereof to perform secure MRC training using MRC code stored in memory 222. In turn, AV module may be implemented in some embodiments as hardware, software, firmware, and/or combinations thereof to perform secure AV detect using AV code (including malware detection and/or remediation code) stored in memory 222. In other cases, malware detection and remediation operations may be implemented via a separate system that communicates with a platform over a secure OOB channel such as an Intel® Active Management Technology (AMT) channel.

FIG. 2 further describes interaction between hardware of SoC 210 and software executing on the platform during a hot plug event. More specifically, when additional memory 230 is added into a system dynamically, such hot plug may be detected by memory controller 228, which in turn sends a hot plug event notification via an Advanced Configuration and Platform Interface (ACPI) 270 communication as a hot plug indication to a platform TEE driver 260. In an embodiment platform TEE driver 260 may be implemented within an OS kernel. As illustrated, platform driver TEE may include a memory initialization module 262 and an event handler 264.

Responsive to receipt of the hot plug notification, event handler 264 may send a notification to memory initialization module 262, which may perform various OS-based initialization operations. Still further, memory initialization module 262 may issue an MRC training request. Instead of a conventional memory training via a BIOS 275, this memory training request may be issued, e.g., via a host embedded controller interface (HECI) (not shown in FIG. 2) to TEE MRC module 224. In turn, MRC module 224 may execute MRC code, e.g., stored in SRAM 222, to perform the training of newly added memory 230

In an embodiment, TEE 220 may issue an interrupt upon completion of MRC training to alert the host TEE driver. The interrupt may be processed by a platform security driver within platform TEE driver 260, which can then query TEE 220 for additional information as appropriate (e.g., success or failure, diagnostic information, etc.). Then after successful completion, acknowledgement of completion notification is provided to platform BIOS 275, e.g., using UEFI API or an equivalent mechanism to complete various other implementation-specific operations such as updating a memory map, exposing newly trained memory to OS and so forth.

With embodiments that implement MRC techniques within a secure environment, alerts and patching operations similarly may be performed via an OOB mechanism (e.g., in a manner transparent to an OS/BIOS). Thus as further illustrated in FIG. 2, MRC module 224 may communicate via a secure OOB channel 235 with a remote administrator 250. In the embodiment shown, this communication may be via a given network 240 (such as an Internet-based) to which remote administrator 250 couples by way of another channel 245. In various network embodiments, remote administrator 250 may be an administrator server, e.g., of a data center in which system 200 is implemented. In an embodiment, remote administrator 250 may be present at a cloud-based location. By way of this out-of-band channel, MRC module 224 may communicate alerts such as memory errors, including, as an example row hammer instances or so forth. In addition, MRC code and/or other memory controller code can be updated by way of patches or so forth via this out-of-band connection such that, e.g., MRC code stored in SRAM 222 can be dynamically updated.

Understand that this MRC execution within a TEE can be used to perform dynamic runtime memory training for hot plug memory independent of host OS/SMM hooks. Thus via this separate secure channel, MRC module 224 can securely communicate regarding existence of a row hammer or other memory error or failure, and potentially receive updated memory configuration parameters such as an updated refresh rate, without a BIOS update or interaction with an insecure host OS.

Embodiments may thus reduce dependency on SMM code to handle memory operations such as hot plug, thereby avoiding attack surface for SMM vulnerabilities. Embodiments can perform MRC operations in a manner that is OS scheduler friendly, as it can run on a TEE independent of a host processor. Embodiments can be applicable and scalable to different hypervisor or OS models.

Administrator 250 may be configured to aggregate alerts from a variety of systems running MRC and AV modules within TEEs as described herein. In some embodiments, there may be a logical distinction between an administrator and malware detection/remediation components. In such embodiments, for threat-related operations, the administrator may logically equate to control plane operations and the malware detection and remediation agent may logically equate to data plane operations.

In any case, such alerts may be received via secure OOB channels. Based on crowd-sourced data, administrator 250 may identify security exploits or other threats, and perform exploit mitigation patch deployment via this same secure OOB channel independent of a host processor and OS of the individual systems. As used herein, "crowd-sourced data" refers to information temporally aggregated from multiple, potentially geographically diverse, sources. Such data may be used in various forms of analytics, including but not limited to rule-based/probability heuristics/machine learning.

Figure 3:
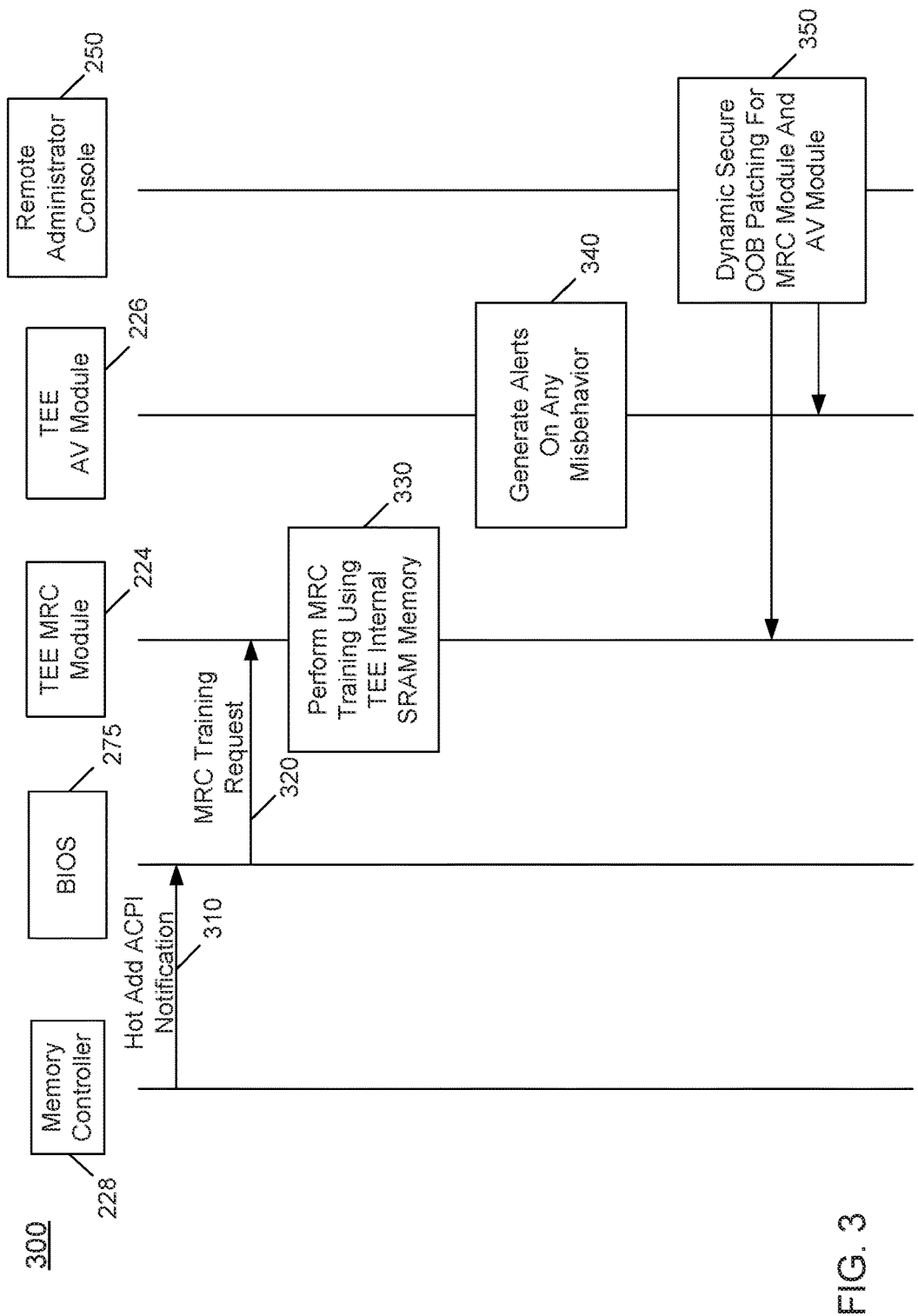
FIG. 3 is an operational flow of a memory reference code (MRC) technique in accordance with an embodiment of the present invention.

Referring now to FIG. 3, shown is an operational flow of an MRC technique in accordance with an embodiment of the present invention. As shown in FIG. 3, method 300 may be performed to initialize dynamically added memory. To this end, responsive to detection by memory controller 228 of this hot plug event, an ACPI notification (310) is sent to BIOS 275, which in turn causes an MRC training request (320) to be received by MRC module 224. Note that this communication may more specifically proceed through a platform TEE driver. In turn, MRC module 224 may execute MRC code (e.g., stored in an internal SRAM) to perform appropriate training (330) to enable the newly added memory to be initialized. While the scope of the present invention is not limited in this regard, example MRC operations include control of refresh rates, and updating of various configuration information (e.g., both within the memory and the memory controller). Additionally, such MRC operations may further include testing the initialized memory to confirm proper operation. If any errors or other misbehavior occurs, AV module 226 may issue alerts (340), which in an embodiment can be sent to the platform TEE driver or BIOS for handling or to a remote administrator console 250 via OOB channel. At this point, the newly added memory is ready for use during normal operation. Note that a TEE may have a security agent that communicates securely with a network-accessible malware detection and remediation module, instead of an embedded component within the TEE.

FIG. 3 further shows example operations that may be performed to dynamically update MRC code via an out-of-band channel. More specifically, a remote administrator console 250 may send such updates (350) when appropriate. As an example, based on crowd-sourced information from a plurality of systems (e.g., of a data center) the remote administrator or other entity may determine that particular refresh rates or particular code executed on similarly configured systems is causing particular memory errors (e.g., row hammer errors). Responsive to such determination, the entity (or another entity) may generate patch code (e.g., with different refresh rates or so forth), which remote administrator console 250 can communicate to MRC module 224 or AV module 226 by way of an OOB channel. In turn, assuming the communication is authenticated, TEE 220 may update one or more code blocks executed by its constituent modules. Understand while shown at this high level in FIG. 3, many variations and alternatives are possible.

Figure 4:
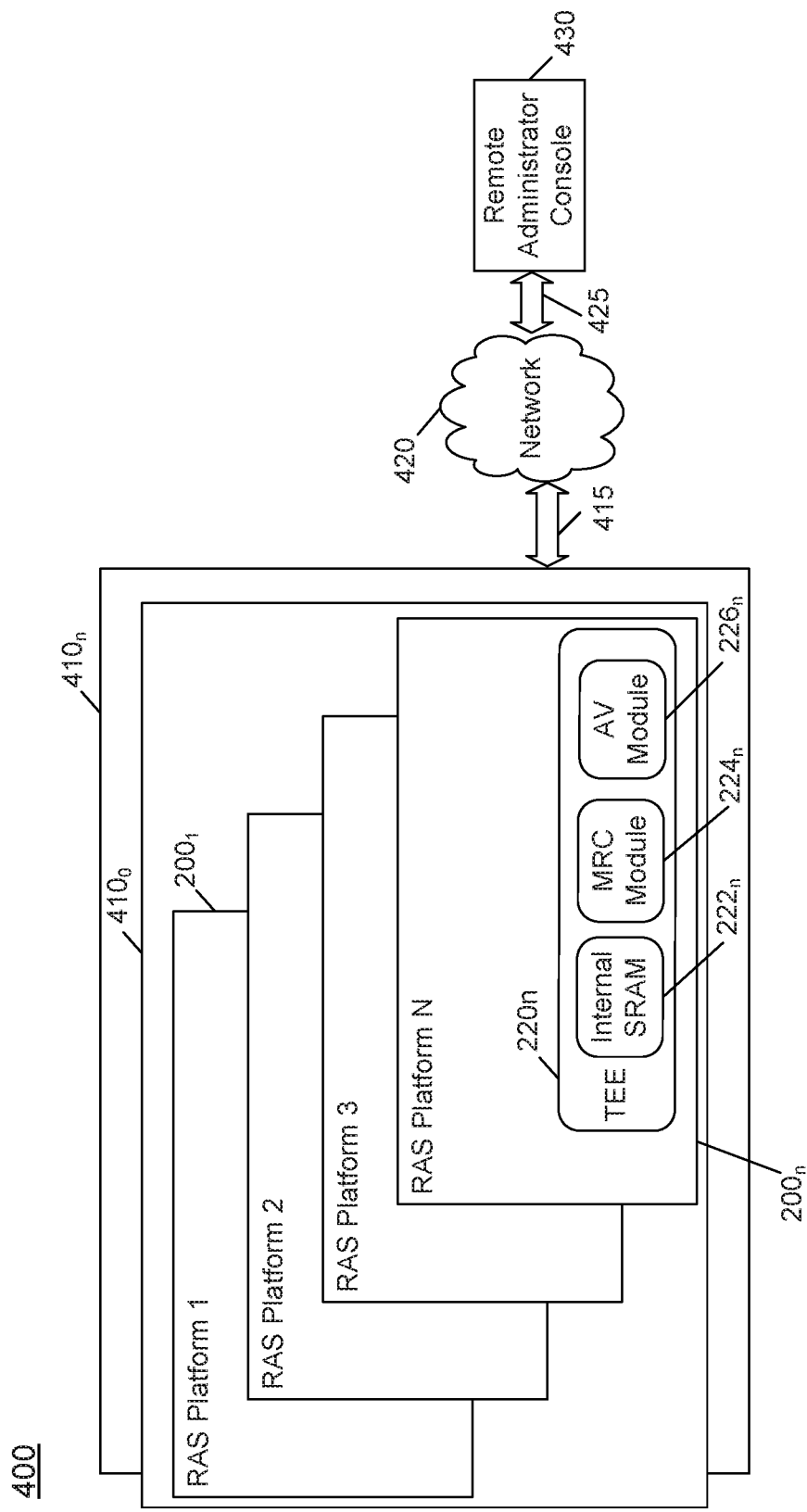
FIG. 4 is a block diagram of an arrangement in accordance with an embodiment.

Referring now to FIG. 4, shown is a block diagram of an arrangement, e.g., of a datacenter environment 400. In an embodiment, datacenter environment 400 may be a cloud-based datacenter in which a plurality of rack-based units 410₀-410ₙ are present. Each such rack-based unit 410 may be a cabinet or other enclosure to support a plurality of rack-mounted datacenter equipment pieces. In different embodiments, such enclosures may be configured to house server-based systems, storage-based systems, networking systems, load balancing systems and so forth. In relevant part here, rack-based unit 410₀ is shown to include a plurality of platforms 200₁-200ₙ. Each such platform 200 may be a high availability server that provides for high measures of reliability, availability and serviceability (RAS). In an embodiment, each such platform 200 may be implemented as shown in FIG. 2. In relevant part illustrated in FIG. 4, platform 200ₙ includes a TEE 220ₙ including internal memory 222ₙ, MRC module 224ₙ and AV module 226ₙ. Of course each such platform includes further components, as discussed above.

As further illustrated in FIG. 4, rack-based units 410, which may be in the same or different geographic location, communicate via a network 420 (and intervening communication channel 415) with a remote administrator console 430 (via an intervening communication channel 425). Note that these communication channels may be secured OOB channels to provide for out-of-band monitoring information, control information, and updates as described herein.

As remote administrator console 430 is configured to communicate with a variety of different platforms (which may be commonly located, or separated, as in different datacenters of a cloud service provider), it can leverage information received from these wide variety of systems to identify issues raised via crowd-sourced data. More specifically, as described herein, remote administrator console 430 may receive information from a variety of platforms 200 regarding memory failures, errors and so forth, including potential security exploits. Responsive to such information, such as when a row hammer error is identified in a number of platforms having the same MRC code (e.g., including the same refresh rate settings), remote administrator console 430 may trigger an update to the MRC code, such as by way of refresh rate updates. Thereafter, remote administrator console 430 can issue patches or other updates to the MRC code, AV code or any other appropriate code, via out-of-band channels in a manner transparent to an OS/BIOS executing on platforms 200.

Figure 5:
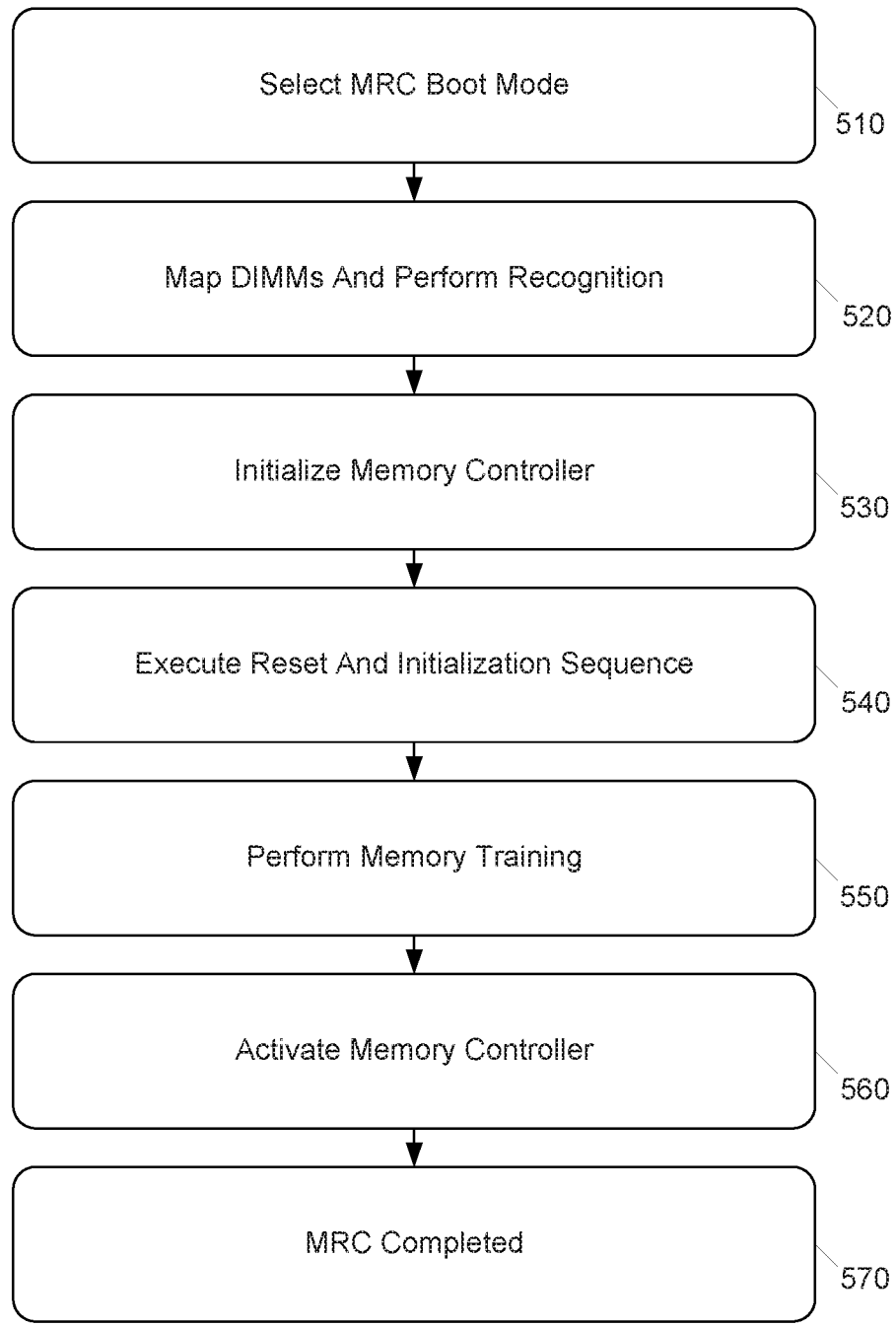
FIG. 5 is a flow diagram of an example memory reference code execution in accordance with an embodiment.

Referring now to FIG. 5, shown is a flow diagram of an example memory reference code execution in accordance with an embodiment. As shown in FIG. 5, method 500 may be performed by an MRC module that executes within a TEE. As illustrated, method 500 may begin by selecting an MRC boot mode (block 510). This selection may be between different types of MRC code, each configured for a particular phase of system configuration/operation. For example, such boot modes may include a factory boot, in which an originally installed memory is to be configured, a fast boot, which may occur upon reset of a system, and a warm reset boot, which may occur dynamically in the field, such as when additional memory is dynamically inserted or upon exit from particular system low power states. In an embodiment, this selection may be responsive to control information received, e.g., from BIOS.

Next at block 520, the memory is mapped and recognition is performed. For example, serial presence detects (SPDs) of different memory modules within a memory can be read, and a configuration of the memory, such as type of memory devices, number of modules, communication channels, among other configuration parameters, can be identified.

Thereafter at block 530 a memory controller is initialized. Such initialization may include loading a set of configuration registers of the memory controller. Thereafter at block 540 the memory may be reset and an initialization sequence can be executed. Thereafter at block 550 memory training may be performed. More specifically, this training may include input/output (I/O) training, which may provide for training to determine margins for communication speeds, power levels, performance and so forth. To this end, test patterns can be written to and received from the memory at different speeds, voltages and so forth to identify configuration parameter information. Such information may be stored, at a conclusion of training as configuration parameters, compensation data and so forth. Still further, if any errors are identified during such training, they may be communicated, e.g., via an out-of-band channel to a platform driver, and/or external entity. Further at the conclusion of successful memory training, at block 560 the memory controller may be activated, e.g., to enable refreshes to occur at a configured refresh rate, to perform error correction coding (ECC), to power down clock enables and so forth. Thus at a completion of this stage, at block 570 the MRC process is completed, and normal operation with the memory can occur. Understand while shown at this high level in the embodiment of FIG. 5, many variations and alternatives are possible.

The following Examples pertain to further embodiments.

In Example 1, a processor comprises: at least one core to execute instructions; and a security engine coupled to the at least one core to execute transparently to an OS to execute on the at least one core. The security engine may include a MRC module to perform training for a memory coupled to the processor transparently to the OS while the at least one core is to perform a workload orthogonal to the training.

In Example 2, the security engine is to execute in a trusted execution environment.

In Example 3, the MRC module is to execute MRC code stored in an internal memory of the security engine.

In Example 4, the MRC module is to perform the training responsive to a hot plug insert of the memory.

In Example 5, a BIOS is to execute on the at least one core, and detect the hot plug insert and communicate the detection to a platform driver. In turn, the platform driver is to issue a request to the security engine to initiate the training for the memory.

In Example 6, the MRC module is to alert the platform driver regarding a result of the training.

In Example 7, the MRC module is to cause the BIOS to update a memory controller with configuration information of the hot plug memory.

In Example 8, the MRC code is to be dynamically updated from a remote source via an out-of-band channel.

In Example 9, the MRC module, responsive to execution of updated MRC code, is to cause update to at least one configuration parameter of the memory, to reduce an exploit scenario.

In Example 10, a method comprises: receiving, in a TEE of a processor of a computing system, a request to perform training of a memory of the computing system; performing the training of the memory via the TEE, responsive to training code stored in an internal memory of the TEE; and reporting a result of the training to a driver that executes on at least one core of the processor, where the at least one core is to execute at least one workload during the training.

In Example 11, the method further comprises receiving the request to perform the training from the driver, the driver to receive an indication of a hot plug event from a basic input/output system.

In Example 12, the method of one or more of the above Examples further comprises receiving update information from an external entity and updating the training code based on the update information.

In Example 13, the update information includes updated configuration parameter information to mitigate an exploit scenario.

In Example 14, the update information is based on crowd-sourced data.

In Example 15, the update information includes refresh rate information.

In another example, a computer readable medium including instructions is to perform the method of any of the above Examples.

In another example, a computer readable medium including data is to be used by at least one machine to fabricate at least one integrated circuit to perform the method of any one of the above Examples.

In another example, an apparatus comprises means for performing the method of any one of the above Examples.

In Example 16, a system comprises: a processor and a security processor to execute in a TEE. The security processor may be configured to execute MRC stored in a secure storage of the TEE to train a memory coupled to the processor, where the security processor is to execute the MRC transparently to a BIOS. The system may further include the memory coupled to the processor.

In Example 17, the processor further comprises at least one core, the at least one core to execute an orthogonal workload while the security processor is to execute the MRC.

In Example 18, the security processor is to train the memory responsive to a hot plug insert of the memory.

In Example 19, the system further comprises a network interface to communicate with a remote administrator, and the security processor to communicate with the remote administrator via an out-of-band channel. The security processor may receive one or more MRC patch updates via the out-of-band channel and store the one or more MRC patch updates in the secure storage.

In Example 20 the security processor is, responsive to a next request to train the memory, to execute the MRC having the one or more MRC patch updates.

In Example 21, the security processor is further to execute malware detection code. The system may further comprise a network interface to communicate with a malware remediation agent. The security processor may communicate with the malware remediation agent via an out-of-band channel, where the security processor is to receive one or more malware detection code patch updates via the out-of-band channel and store the one or more malware detection code patch updates in the secure storage.

In Example 22, a processor comprises security means for executing transparently to an OS that is to execute on a core means, the security means including a MRC means for performing training for a memory coupled to the processor transparently to the OS while the core means is to perform a workload orthogonal to the training.

In Example 23, the security means is to execute in a trusted execution environment.

In Example 24, the MRC means is to execute MRC code stored in an internal memory of the security means.

Understand that various combinations of the above Examples are possible.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
at least one hardware processor core to execute instructions; and
a microcontroller in circuit with the at least one hardware processor core, the microcontroller to execute a security engine in a trusted execution environment to, in response to a hot plug insert of a first memory, train the first memory transparently to an operating system (OS), the security engine including a memory reference code (MRC), the MRC stored in an internal memory, the security engine to:
in response to the hot plug insert of the first memory, execute the MRC to perform, transparently to the OS, the training of the first memory while the at least one hardware processor core performs a workload orthogonal to the training;
securely communicate a memory error to a remote entity via an out-of-band channel; and
dynamically update the MRC stored in the internal memory based on an MRC update obtained from the remote entity via the out-of-band channel; and
a platform driver to receive a communication from a basic input/output system (BIOS) indicating the detection of the hot plug insert, the platform driver to issue a request to the security engine to perform the training of the memory.

2. The system of claim 1, further comprising the BIOS, the BIOS to execute on the at least one hardware processor core.

3. The system of claim 2, wherein the security engine is to alert the platform driver regarding a result of the training.

4. The system of claim 2, wherein the security engine is to update a memory controller with configuration information of the hot plug inserted memory.

5. The system of claim 1, wherein the security engine is to, responsive to execution of the dynamically updated MRC, update at least one configuration parameter of the first memory to reduce an exploit scenario.

6. At least one non-transitory computer readable storage medium comprising instructions that when executed by one or more microcontrollers implementing a security engine in a trusted execution environment (TEE), cause the one or more microcontrollers to at least:
obtain, from a platform driver, receive, in a trusted execution environment (TEE), a request to perform training of a memory of the computing system, the request initiated by a basic input/output system (BIOS) of a computing system in response to detection of a hot plug insert of the memory;
perform the training of the memory transparently to the BIOS via the TEE based on memory reference code (MRC) stored in an internal memory of the TEE;
report a result of the training to the platform driver that executes on at least one hardware processor core of the computing system, wherein the at least one hardware processor core is to execute at least one workload during the training, the workload being orthogonal to the training;
securely communicate, from the TEE, a memory error to an external entity via an out-of-band channel;
receive, in the TEE, update information for the training code from the external entity via the out-of-band channel; and
dynamically update the training code in the internal memory of the TEE based on the received update information.

7. The at least one non-transitory computer readable storage medium of claim 6, wherein the request to perform the training is from the platform driver, responsive to the platform driver receiving an indication of a hot plug insert from the BIOS.

8. The at least one non-transitory computer readable storage medium of claim 6, wherein the update information includes updated configuration parameter information to mitigate an exploit scenario.

9. The at least one non-transitory computer readable storage medium of claim 8, wherein the update information is based on crowd-sourced data.

10. The at least one non-transitory computer readable storage medium of claim 8, wherein the update information includes refresh rate information.

11. A system comprising:
a hardware processor;
a microcontroller implementing a security engine, the security engine responsive to a communication from platform driver initiated by a basic input/output system (BIOS), the communication indicating detection of a hot plug insert of a memory, the security engine to:
execute memory reference code (MRC) in a trusted execution environment (TEE) transparently to the BIOS to train the memory, the MRC stored in a secure storage of the TEE;
communicate a memory error to a remote entity via an out-of-band channel;
obtain one or more MRC patch updates from the remote entity via the out-of-band channel; and
update the MRC based on the one or more MRC patch updates;
wherein the hardware processor includes at least one hardware processor core to execute an orthogonal workload while the security engine executes the MRC to train the memory.

12. The system of claim 11, further comprising a network interface to communicate with the remote entity.

13. The system of claim 12, wherein the security engine is to execute, responsive to a next request to train the memory, the MRC updated with the one or more MRC patch updates.

14. The system of claim 11, further comprising a network interface to communicate with a malware remediation agent, the security engine to: (i) execute malware detection code; (ii) communicate with the malware remediation agent via an out-of-band channel; (iii) receive one or more malware detection code patch updates via the out-of-band channel; and (iv) store the one or more malware detection code patch updates in the secure storage.

* * * * *

UNITED STATES PATENT AND TRADEMARK OFFICE
CERTIFICATE OF CORRECTION

PATENT NO. : 10,114,952 B2
APPLICATION NO. : 15/084564
DATED : October 30, 2018
INVENTOR(S) : Atul A. Khare Page 1 of 1

It is certified that error appears in the above-identified patent and that said Letters Patent is hereby corrected as shown below:

In the Claims

Column 9, Lines 58-59 (Claim 6):
Remove "receive, in a trusted execution environment (TEE),".

Signed and Sealed this
Twenty-sixth Day of March, 2019

Andrei Iancu
*Director of the United States Patent and Trademark Office*